(12) United States Patent
Wei et al.

(10) Patent No.: US 12,555,236 B2
(45) Date of Patent: Feb. 17, 2026

(54) MYOCARDIAL BLOOD FLOW ESTIMATION WITH AUTOMATED MOTION CORRECTION

(71) Applicant: CEDARS-SINAI MEDICAL CENTER, Los Angeles, CA (US)

(72) Inventors: Chih-Chun Wei, Los Angeles, CA (US); Piotr Slomka, Los Angeles, CA (US); Serge D Van Kriekinge, Encino, CA (US)

(73) Assignee: CEDARS-SINAI MEDICAL CENTER, Los Angeles, CA (US)

( * ) Notice: Subject to any disclaimer, the term of this patent is extended or adjusted under 35 U.S.C. 154(b) by 339 days.

(21) Appl. No.: 18/367,167

(22) Filed: Sep. 12, 2023

(65) Prior Publication Data

US 2024/0087126 A1    Mar. 14, 2024

Related U.S. Application Data

(60) Provisional application No. 63/405,708, filed on Sep. 12, 2022.

(51) Int. Cl.
*G06T 7/00* (2017.01)
*A61B 6/00* (2006.01)
(Continued)

(52) U.S. Cl.
CPC ............ *G06T 7/0016* (2013.01); *A61B 6/037* (2013.01); *A61B 6/503* (2013.01); *A61B 6/507* (2013.01);
(Continued)

(58) Field of Classification Search
CPC ........... G06T 7/0016; G06T 5/50; G06T 7/12; G06T 7/30; G06T 2207/10104; G06T 2207/20221; G06T 2207/30104; G06T 2211/412; G06T 11/005; G06T 2207/30048; G06T 2207/10072; G06T 2211/404; G06T 2207/10076; G06T 2207/10081; G06T 2207/30004; A61B 6/037; A61B 6/503; A61B 6/507; A61B 6/5264; A61B 6/5217; A61B 6/032; A61B 6/5235; A61B 6/4417; A61B 6/486;
(Continued)

(56) References Cited

U.S. PATENT DOCUMENTS

2012/0323118 A1* 12/2012 Menon Gopalakrishna ................ G16H 50/30 600/431
2020/0281567 A1*  9/2020 Hristov .................. A61B 8/481
(Continued)

FOREIGN PATENT DOCUMENTS

| CN | 102301394 A | * | 12/2011 | ........... G06T 7/0014 |
| CN | 102713979 A | * | 10/2012 | ........... G06T 11/206 |
| JP | 2020526348 A | * | 8/2020 | ........... G06T 7/0012 |

*Primary Examiner* — Jose L Couso
(74) *Attorney, Agent, or Firm* — NIXON PEABODY LLP

(57) ABSTRACT

Systems and methods are disclosed for automatically performing motion correction in dynamic positron emission tomography scans, such as dynamic positron emission tomography myocardial perfusion imaging studies. An automated algorithm can be used. The algorithm can use simplex iterative optimization of a count-based cost-function customized to different dynamic phases for performing frame-by-frame motion correction.

20 Claims, 16 Drawing Sheets
(7 of 16 Drawing Sheet(s) Filed in Color)

(51) Int. Cl.
*A61B 6/03* (2006.01)
*A61B 6/50* (2024.01)
*G06T 5/50* (2006.01)
*G06T 7/12* (2017.01)
*G06T 7/30* (2017.01)

(52) U.S. Cl.
CPC .............. *A61B 6/5264* (2013.01); *G06T 5/50* (2013.01); *G06T 7/12* (2017.01); *G06T 7/30* (2017.01); *G06T 2207/10104* (2013.01); *G06T 2207/20221* (2013.01); *G06T 2207/30104* (2013.01)

(58) Field of Classification Search
CPC ......... A61B 6/504; A61B 5/1128; A61B 6/03; A61B 6/5276; G06V 20/698; G06V 2201/03; G16H 50/30; G06F 18/29; G06F 18/39; G06F 9/3014
See application file for complete search history.

(56) References Cited

U.S. PATENT DOCUMENTS

| | | | |
|---|---|---|---|
| 2021/0319558 A1* | 10/2021 | Min | A61K 49/04 |
| 2022/0117508 A1* | 4/2022 | Dharmakumar | A61B 5/145 |
| 2022/0382065 A1* | 12/2022 | Kimura | G02B 27/0179 |

* cited by examiner

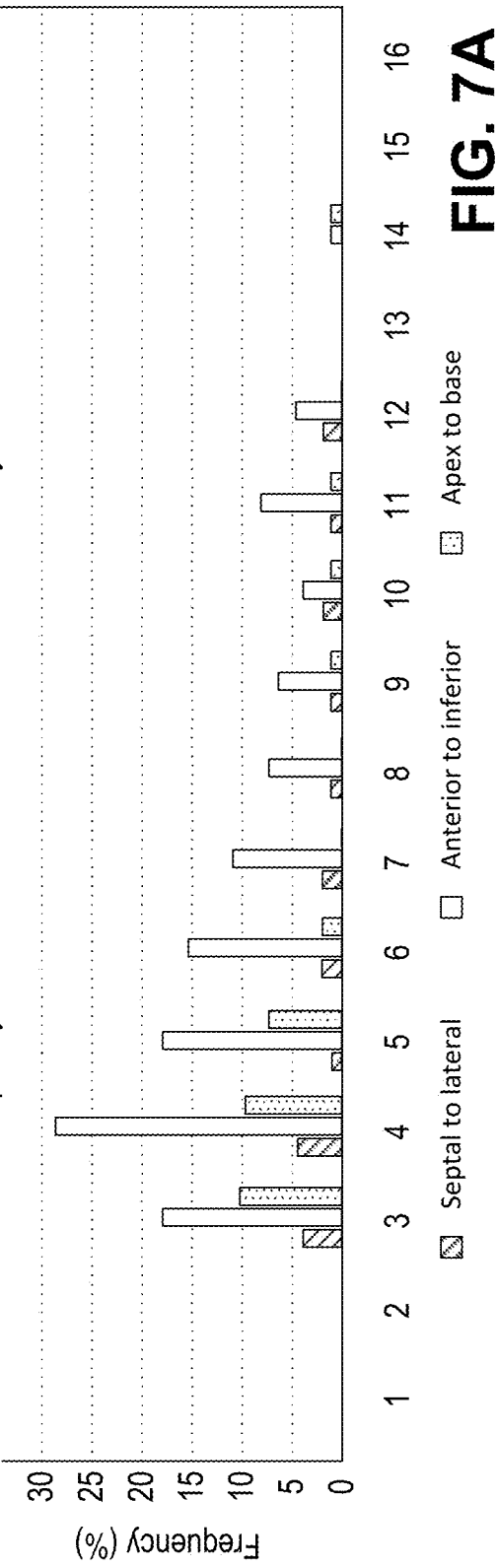
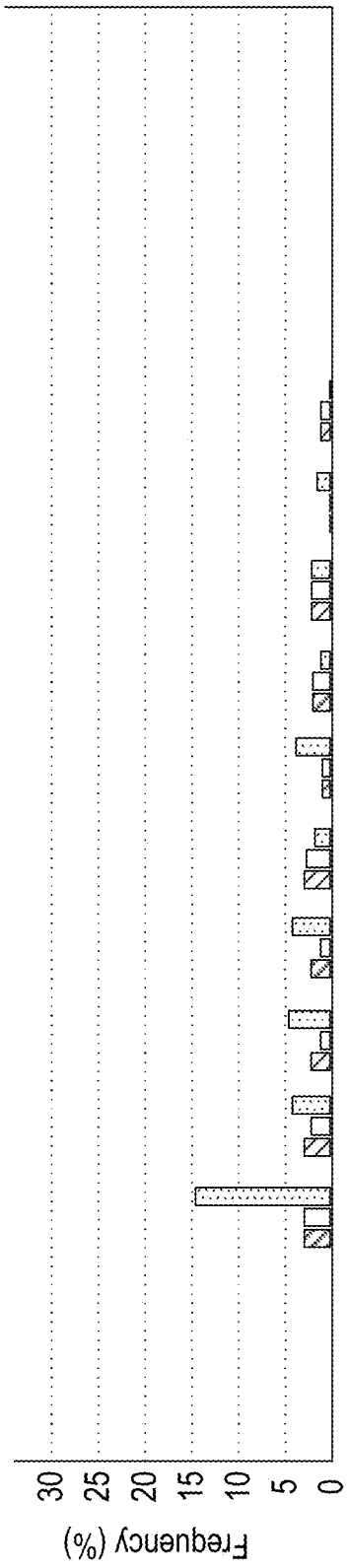
FIG. 7A
FIG. 7B

MYOCARDIAL BLOOD FLOW ESTIMATION WITH AUTOMATED MOTION CORRECTION

CROSS-REFERENCE TO RELATED APPLICATIONS

The present application claims the benefit of U.S. Provisional Patent Application No. 63/405,708 filed Sep. 12, 2022 and entitled "MYOCARDIAL BLOOD FLOW ESTIMATION WITH AUTOMATED MOTION CORRECTION," which is hereby incorporated by reference in its entirety.

TECHNICAL FIELD

The present disclosure relates to diagnostic imaging generally and more specifically to improving analysis of positron emission tomography scanning.

BACKGROUND

Positron emission tomography (PET) scanning is an important tool in medical diagnostic procedures. Acquiring PET scan data includes placing a patient within a PET scanner so that radiation emitted from a radioisotope injected into the patient can be received and recorded. The PET scan data can then be analyzed for various purposes. However, motion artifacts, such as those induced by movement of the patient with respect to the PET scanner, can make certain analysis difficult or unreliable.

In an example, PET scan data from a dynamic PET myocardial perfusion imaging (MPI) study, patient motion correction (MC) is important for accurate quantification of myocardial blood flow (MBF) and myocardial flow reserve (MFR). However, frame-by-frame manual correction is time-consuming and not reproducible. Often, manual correction takes approximately 10 minutes on average per case. Further, manual correction is highly operator dependent, especially between experienced and inexperienced operators.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a method comprising receiving imaging data associated with a dynamic positron emission tomography (PET) myocardial perfusion imaging (MPI) study. The method further comprises applying a motion correction algorithm to the received imaging data to generate motion-corrected imaging data. The motion correction algorithm makes use of simplex iterative optimization of a count-based cost function for performing frame-by-frame motion correction. The method further comprises analyzing the motion-corrected imaging data to obtain at least one quantitative value associated with the myocardial perfusion imaging study.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The specification makes reference to the following appended figures, in which use of like reference numerals in different figures is intended to illustrate like or analogous components.

FIG. 7A is a chart depicting the frequency of manual motion shifts ≥5 mm at stress, according to certain aspects of the present disclosure.

FIG. 7B is a chart depicting the frequency of motion shifts difference ≥5 mm between manual and auto correction at stress, according to certain aspects of the present disclosure.

DETAILED DESCRIPTION

Figure 1:
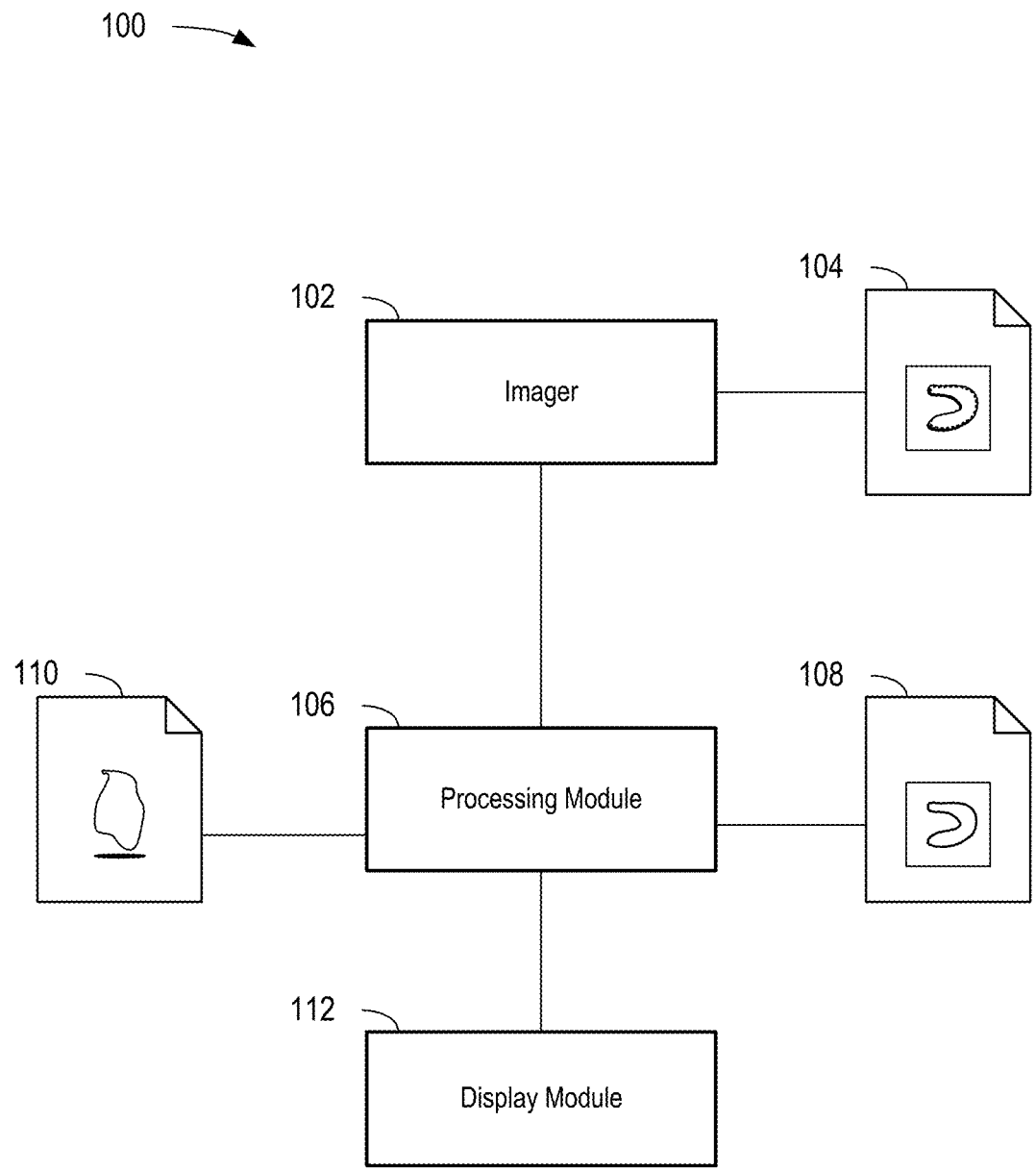
FIG. 1 is a schematic diagram of depicting a computing environment for acquiring and processing imaging data, according to certain aspects of the present disclosure.

Certain aspects and features of the present disclosure relate to systems and methods for automatically performing motion correction in dynamic PET scans, such as dynamic PET MPI. An automated algorithm can be used. The algorithm can use simplex iterative optimization of a count-based cost-function customized to different dynamic phases for performing frame-by-frame MC.

Motion of a subject (e.g., patient) during imaging studies, such as PET scans, especially when imaging is performed of a moving structure, such as a heart, can produce undesirable results in the imaging data, which can lead to a decreased ability to interpret the imaging data and/or generate a diagnosis or other conclusion from the data. As such, motion correction can be leveraged to improve the quality of the imaging data to account for any motion that occurs while the subject is being imaged. Motion correction can be especially useful for imagers that capture imaging data sequentially (e.g., in slices and/or at sequential locations around a subject), as the full subject is unable to be imaged at a single instance. Further, motion correction can be especially useful for imaging studies that require capture over a period of time (e.g., to study movement of a muscle and/or associated tissue).

Manual motion correction is cumbersome and prone to error, and can take a very long time, especially when the number of images is high. There is a need for automated motion correction, which can take imaging data as input and automatically analyze that imaging data to determine how it is to be adjusted for motion correction purposes.

Certain aspects and features of the present disclosure relate to a system capable of analyzing imaging data (e.g., PET imaging data) to perform automated motion correction. This automated motion correction can be leveraged by inexperienced users and can be implemented rapidly without the need for experienced users to spend long durations manually applying motion correction to imaging data. The fast and easy-to-use automated motion correction disclosed herein can achieve results on par with manual correction by experienced operators.

In an example study, two experienced operators performed in 224 consecutive patients undergoing dynamic rest/stress 82Rb PET MPI across 16 frames for stress and rest images in three directions (inferior-superior, septal-lateral, apex-base). The third operator reconciled the MC results by a consensus with each operator. 224 patients were split into a tuning group (n=112) and a validation group (n=112). Automated and manual MC were compared in the early (first 2 minutes) and late phases for the validation group. Additionally, operators performed MC on a population undergoing 82Rb PET and invasive angiogram within 18 days (testing group: n=112) which is separate from the tuning and validation groups. MFR was obtained by fitting the corresponding time-activity curves for each polar map region using QPET software (Cedars-Sinai). The per-patient diagnostic performance for the detection of obstructive coronary artery disease (CAD) by minimal 17-segment MFR was compared for automated MC in the testing group. Obstructive CAD was defined as ≥50% stenosis in the left main trunk or ≥70% stenosis in any of the main coronary arteries.

In the aforementioned example study, the automated algorithm generates the corrections in <12 seconds per case (stress and rest). The mean/max manual shifts in any direction were 0.8/16 mm at stress and 0.5/14 mm at rest in early phase, and 0.3/8 mm at stress, and 0.2/13 mm at rest in late phase. Manual shifts ≥5 mm at stress and rest respectively were made in 10% and 7% in septal-lateral, 51% and 17% in anterior-inferior, and 27% and 15% in apex-base directions. The frequency of motion differences ≥5 mm between manual and automated MC in septal-lateral and anterior-inferior directions were <5% across all frames at stress and rest. In base-apex direction, motion differences ≥5 mm were observed still in 14% in frame 3 at stress and <5% in remaining frames at stress and rest. There was no significant difference in area under the curve in MFR between operator motion correction and the automatic MC algorithm (0.77 [0.68–0.86] vs. 0.79[0.71–0.88], p=0.38).

Thus, it has been found that patient MC on dynamic rest/stress 82Rb PET MPI can be performed automatically and rapidly with good agreement with experienced operators by making use of certain aspects and features of the present disclosure. Automatic and manual MC demonstrate similar diagnostic performance for the detection of CAD.

In an example study, a total of 224 consecutive patients were retrospectively selected from the population who underwent stress and rest Rb PET MPI. The 224 patients were split into a tuning group (n=112) and a validation group (n=112). Additionally, 112 patients undergoing 82Rb PET and invasive angiogram within 18 days was collected as a testing group. The flow chart of study population is shown in FIG. 1.

Invasive coronary angiography was visually evaluated blindly by experienced cardiologists. Obstructive CAD was defined as either ≥50% stenosis in left main trunk or ≥70% reduction in left anterior descending artery (LAD), left circumflex (LCX), or right coronary artery (RCA).

Dynamic images were also processed in batch mode left ventricular (LV) contours (e.g., with the QPET software). LV contours were positioned automatically with an improved algorithm. Briefly, the LV contour was determined from the summed dynamic image data skipping the first 2 min—a method that is based on the original quantitative gated SPECT contour detection principles and the improved valve-plane definition of attenuation-corrected high-resolution PET. When necessary, contours were adjusted to correspond to the myocardium by an experienced operator. The 3D cylindric region for the LV input function was automatically placed in the middle of the valve plane, with a 1- by 2-cm length oriented along the long axis of the heart. The dynamic myocardial samples were obtained from the polar map by analyzing all time frames within the fixed LV contour boundaries as previously reported.

MBF and MFR flow maps were computed from the dynamic imaging series with the QPET software implementing the 1-compartment kinetic model. Quantitative MBF in each coronary territory was estimated using the tracer uptake kinetics within a first threshold number of seconds post tracer injection. The spillover fraction from the blood pool to the myocardium plus the vascular volume of distribution was approximated as 1.0 minus the recovery coefficient of the corresponding myocardial sample. The rate-pressure product was calculated as heart rate×systolic blood pressure. Rest MBF values were adjusted for the rate-pressure product (RPP) as MBF adj=MBF/RPP×RPP avg. The average of RPP value across all the study subject was 8,331 bm×mmHg.

Motion was corrected manually for each frame at stress and rest to align the myocardial tracer uptake in each frame with myocardial contours by two experienced operators. The third operator reconciled the motion correction results by a consensus with each operator. For each frame in each dataset, the operators shifted the image in relation to the static LV myocardial contours from the static image in the 3 principal axes. The magnitude of motion was assessed across all patients in the direction of each of the 3 principal axes (x: lateral to septal, y: anterior to inferior, and z: apex to base). The frequency of motion shift ≥5 mm was calculated.

Stress and rest MBF values (mL/min/g) were computed using parametric polar maps. MFR polar maps were computed by dividing the stress MBF by the rest MBF map samples at each polar map sample. Subsequently, average MBF, and MFR were computed directly from polar maps samples, globally, per vascular territory, and per-segment. All MBF and MFR values were derived automatically in batch mode without any human intervention.

The automated motion correction is based on registering individual frames to the fixed LV and RV contours segmented from a static summed image of the dynamic frames after the first 2 minutes (manually corrected when necessary). Three key frames were identified along the activity-time curves of LV input ROI, RV input ROI and LV myocardium. These frames were selected for their clear correspondence to regions defined by the contours: i) LV blood pool peak, where tracer activities were mostly expected to fill just the cavity within LV endocardial surface; ii) LV blood pool and myocardium crossover, where activities were expected to fill both LV cavity and myocardium; iii) End of acquisition, where activities were expected to be mostly within LV myocardium.

Specific similarity metrics between the frames and contours were developed for each key frame using a combination of measures. These measures included counts in various regions defined by the contours (LV cavity, LV myocardium, beyond LV epicardial surface and RV), image gradients along epi- or endocardial surfaces, uniformity within LV myocardium, and mutual information between the dynamic frame and a pseudo image generated by labeling each region with unique pixel values.

The key frames were registered to the contours by their specific similarity metrics. For each frame between two key frames, an artificial reference frame was generated by blending the key frames proportionally according to the activity-time curves. Then the in-between frame was registered to this reference by mutual information. Frames earlier than LV blood pool peak (but with no less than 20% of peak LV input ROI activity to have enough counts for the registration's reliability) were registered independently with another similarity metric that included measures involving RV to account for RV blood pool activities in earlier frames.

For detection of CAD, 3 separate approaches were tested using the testing set: 1) Global estimation: defined by average MFR, and MBF value of the entire left ventricle 2) Minimal vessel estimation: Minimal MBF and MFR among three average territorial values, according to the American Heart Association model [20], and 3) Minimal segment estimation: Minimal MBF and MFR segmental value among 17 segments. Subsequently, one value per patient (global, minimal vessel, or minimal segment) was used as a determinant of the presence or absence of CAD in a patient.

Categorical variables are presented as frequencies and continuous variables as mean±SD or median and inter-quartile ranges. Variables were compared using a $\chi^2$ statistic for categorical variables. For continuous variables, Wilcoxon rank-sum test was used to compare unpaired samples, and sign-rank test was used to compare paired samples. The correlation of MBF values between automated and manual corrections were assessed using linear regression analyses and Bland-Altman plots. The diagnostic performance of stress MBF and MFR was evaluated using the analysis and pairwise comparisons of the areas under the receiver operating characteristic curve (AUC). A two-tailed P-value <0.05 was considered statistically significant. R studio version 1.3.959 (RStudio, Boston, MA), MedCalc version 20, and Stata version 14 (Stata Corp, College Station, TX) were used for all analyses.

Patient characteristics are shown in Table 1.

TABLE 1

|  | Tuning Set | Validation Set | Angio Set |
| --- | --- | --- | --- |
| number | 112 | 112 | 112 |
| Age | ± | 72 ± 11 | ± |
| Male |  | 62% |  |
| Obstructive CAD | — | — |  |
| LM disease | — | — | 7% |
| LAD disease | — | — | 34% |
| LCX disease | — | — | 27% |
| RCA disease | — | — | 18% |

Mean and maximal motion shifts in early and late phases in the validation set are shown in Table 2.

TABLE 2

| | Mean (Maximum) | | Manual Correction | Auto | Difference |
| --- | --- | --- | --- | --- | --- |
| Early | Septal to lateral | Stress | 0.5 (4.4) | 1.1 (5.9) | 1.1 (5.3) |
| | | Rest | 0.4 (2.0) | 0.9 (3.0) | 0.9 (2.1) |
| | Anterior to inferior | Stress | 1.5 (6.3) | 1.8 (5.7) | 1.1 (2.8) |
| | | Rest | 0.6 (4.8) | 1.0 (5.4) | 0.8 (2.7) |
| | Apex to base | Stress | 0.7 (3.1) | 1.3 (4.2) | 1.4 (5.4) |
| | | Rest | 0.5 (5.1) | 1.1 (5.0) | 1.1 (2.5) |
| Late | Septal to lateral | Stress | 0.4 (4.0) | 0.8 (4.2) | 0.8 (3.2) |
| | | Rest | 0.2 (2.2) | 0.8 (2.9) | 0.8 (2.8) |
| | Anterior to inferior | Stress | 0.8 (4.0) | 1.1 (3.5) | 0.9 (2.5) |
| | | Rest | 0.4 (4.6) | 0.8 (3.1) | 0.8 (2.7) |
| | Apex to base | Stress | 0.3 (1.8) | 1.1 (3.4) | 1.2 (3.7) |
| | | Rest | 0.2 (6.0) | 1.0 (3.9) | 1.1 (2.5) |

Certain aspects and features of the present disclosure improve how imaging analyzing computer systems operate by providing system for generating motion-corrected imaging data quickly, accurately, and without the need for manual motion correction by skilled operators.

Certain aspects and features of the present disclosure effect a particular treatment or prophylaxis for a disease or medical condition. For example, in some cases, certain aspects of the present disclosure can provide motion-corrected imaging data that can predict cardiac problems (e.g., obstructive CAD) better than when no motion correction is used. As a result, the patient can be provided with advanced notice of when to begin treatment or take other actions to protect against major cardiac events, faster than existing techniques and without the need to wait for experienced operators to become available and to take time to apply manual motion correction to the imaging data.

Certain aspects and features of the present disclosure are closely integrated in and provide significant benefits to a specific field of technology, such as the interpretation of dynamic PET MPI imaging studies, such as to predict obstructive CAD. While techniques have been used in the past to apply manual motion correction to PET MPI imaging data, certain aspects and features of the present disclosure allow for PET MPI imaging data to be automatically motion corrected in a quick and reliable way, without the need for an experienced operator's manual motion correction.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram depicting a computing environment 100 for acquiring and processing imaging data, according to certain aspects of the present disclosure. The computing environment 100 can include an imager 102, a processing module 106 (e.g., one or more computers or other suitable data processing apparatuses), and a display module 112. The imager 102, processing module 106, and display module 112 can be incorporated into a single housing or split into any number of housings, whether physically coupled together or not. The imager 102, processing module 106, and display module 112 can be located in a shared location (e.g., a room, suite, facility, or building) or in different locations. In some cases, the imager 102 can be located in a first location and the processing module 106 and display module 112 can be located in a separate, second location. For example, the imager 102 can be a PET imaging machine located in a medical imaging facility and the processing module 106 and display module 112 can be a physician's computer workstation (e.g., the processor and display of the computer workstation) in the physician's office that is located in a separate facility, separate city, or even separate county as the medical imaging facility. Other combinations can occur.

The imager 102 can be any suitable imaging device for generating imaging data 110 of a subject, such as imaging data of cardiac tissue. In some case, the imager 102 is a PET imager (e.g., a PET scanner). The imager 102 can include detector(s) and any other components usable to generate and/or transmit imaging data 104 from the data acquired by the detector(s).

The imager 102 can be communicatively coupled to the processing module 106 and/or the display module 112 via any suitable technique, such as wired or wireless connections, including direct connections or networked connections. In some cases, imager 102 can be coupled to processing module 106 via a network, such as a local area network, a wide area network, a cloud network, or the Internet. In some cases, data transfer between the imager 102 and the processing module 106 can occur via removable physical media, such as compact disks or flash drives.

The imaging data 104 can be stored and/or transferred in any suitable format. In some cases, the imaging data 104 can be stored and/or displayed as two-dimensional or three-dimensional images. In some cases, the imaging data 104 can be stored as a collection of data points or voxels.

The processing module 106 can be any suitable computing device for processing the imaging data 104 as disclosed herein. The processing module 106 can receive the imaging data 104 and analyze the imaging data 104 to automatically determine and apply motion correction to the imaging data 104 to produce motion-corrected imaging data 108. The motion-corrected imaging data 108 can be a more accurate representation of the subject than the initial imaging data 104 due to the applied motion correction. In some cases, the processing module 106 can additional generate other output data in addition to the motion-corrected imaging data 108, such as output data derived from the motion-corrected imaging data 108 (e.g., a quantitative value associated with the motion-corrected imaging data, an obstructive CAD prediction, and/or other usable predictions or data).

As part of the motion correction process, the processing module 106 can generate a three-dimensional atlas 110 of the portion of the subject that has been imaged in the imaging data 104. For example, in a PET MPI study, the three-dimensional atlas 110 can be a three-dimensional atlas of the ventricles of the subject's heart. Such a three-dimensional atlas 110 can then be used as a registration aid during the automated motion correction process.

In some cases, the processing module 106 can include an input device, such as a computer mouse, keyboard, touchscreen, or the like. The input device can allow a user (e.g., a physician or other medical professional) to interact with the imaging data 104 and control the motion correction process, such as via interaction with the three-dimensional atlas 110 and/or control of how output data (e.g., the motion-corrected imaging data 108) is generated. In some cases, the processing module 106 can include the display module 112 for displaying imaging data 104, the three-dimensional atlas 110, the motion-corrected imaging data 108, and/or other output data. In some cases, the display module 112 is used in conjunction with or includes an input device.

The output data, once generated, can be presented on the display module 112 or otherwise presented to a user or patient. The output data, especially motion-corrected imaging data 108 and/or metrics derived therefrom (e.g., an obstructive CAD prediction) can be usable to help tailor a treatment plan for a patient and/or make a diagnosis for a patient.

Figure 2:
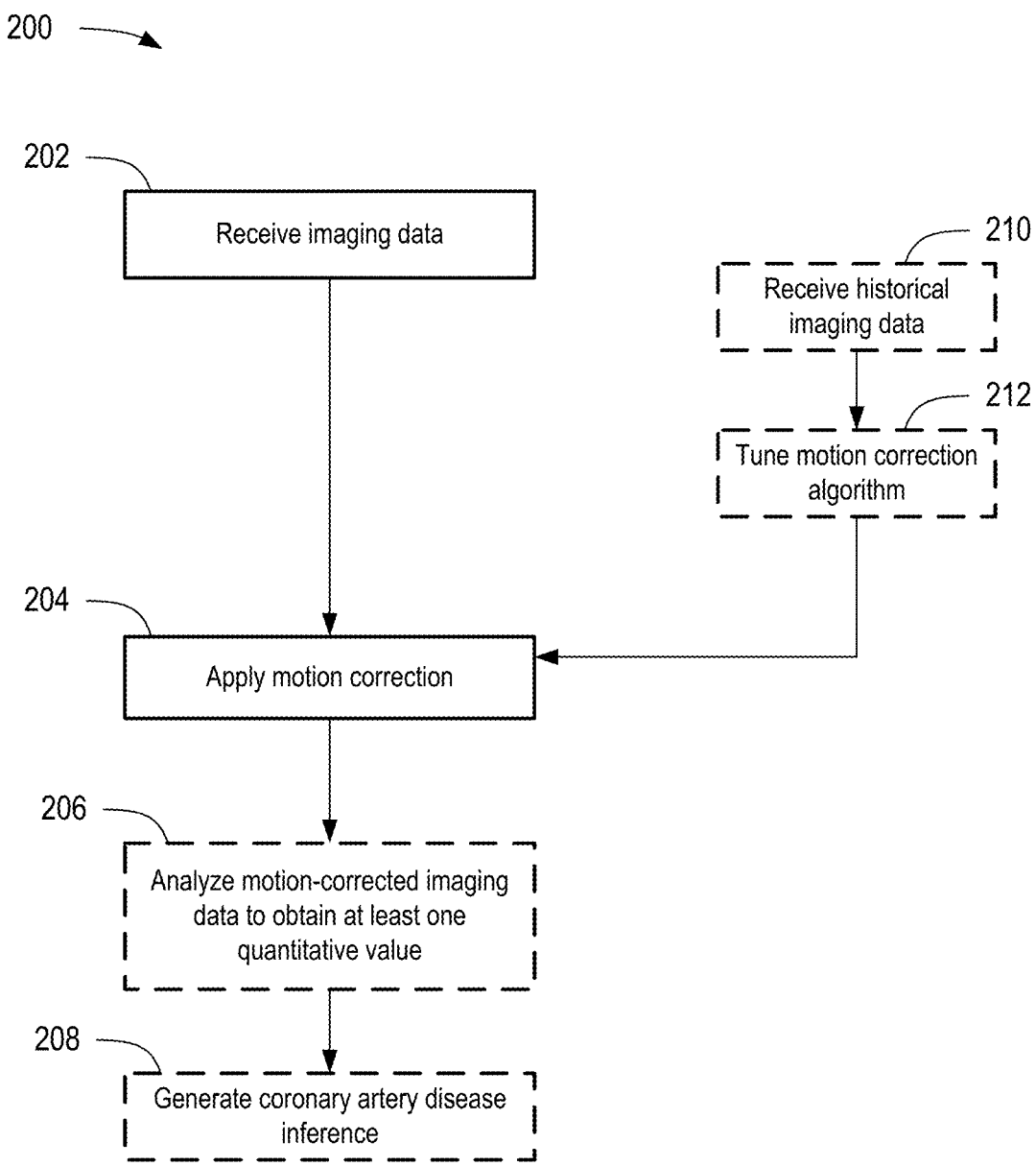
FIG. 2 is a flowchart depicting a process for generating and using motion-corrected imaging data, according to certain aspects of the present disclosure.

FIG. 2 is a flowchart depicting a process 200 for generating and using motion-corrected imaging data, according to certain aspects of the present disclosure. v At block 202, imaging data is received. Imaging data can include PET imaging data, especially PET imaging data form a MPI study. Receiving imaging data at block 202 can include acquiring the imaging data via an imager, although in some cases receiving the imaging data includes receiving already-acquired imaging data from a data storage location. The imaging data received at block 202 can by dynamic imaging data (e.g., imaging data capturing multiple frames of a subject over time).

At block 204, motion correction is automatically applied to the imaging data. Automatically applying motion correction can include applying a motion correction algorithm, such as described in further detail herein. Automatically applying motion correction can include analyzing the imaging data from block 202 to determine an amount of shift (e.g., two-dimensional shift or three-dimensional shift) necessary for each frame of the imaging data, then applying the determined amount of shift to the frame. For example, in a MPI cardiac imaging study, the automated motion correction can apply shifts to each frame along one, two, or three axes including i) the septal-lateral axis, ii) the superior-inferior axis, and iii) the apical-basal axis. In some case, motion correction is automatically applied without the need for manual motion correction.

The motion-corrected imaging data from block 204 can be thereafter used for any suitable purpose, such as for presentation on a display device for further analysis by a professional.

In some cases, at optional block 206, the motion-corrected imaging data can be further analyzed to obtain at least one quantitative value. For example, the motion-corrected imaging data can be analyzed to determine i) MBF at rest, ii) MBF at stress, iii) MFR at rest, iv) MFR at stress, or v) any combination of i-iv. Other metrics can be determined instead of or in addition to MBF and MFR.

In some cases, at optional block 208, a coronary artery disease inference can be generated. The CAD inference can be a prediction of obstructive CAD. In some cases, the prediction of obstructive CAD can be based on the at least one quantitative value determined at block 206. For example, minimal vessel stress MBF or MFR (e.g., the lowest stress MBF or MFR value in the LAD, LCX, and RCA territories) can be used to determine significant CAD. The CAD inference generated at block 208 based on the motion-corrected imaging data from block 204 can be more accurate than if a CAD inference were generated based on the imaging data from block 202.

In some cases, the motion correction algorithm used in block 204 can be tuned at block 212. Tuning the motion correction algorithm can include receiving historical imaging data at block 210 and using the historical imaging data to train and/or tune the motion correction algorithm. For example, to establish a motion correction algorithm that works well for PET MPI imaging studies, various parameters of the motion correction algorithm can be optimized based on analysis of imaging data from a collection of PET MPI imaging studies.

While described with certain blocks in certain orders, in some case process 200 can occur with additional, fewer, or different blocks in different orders. For example, in some cases, process 200 does not include blocks 210, 212. In another example, process 200 may include an additional block between block 202 and block 204 to preprocess the imaging data prior to applying motion correction (e.g., preprocessing to remove various artifacts from the imaging data).

Figure 3:
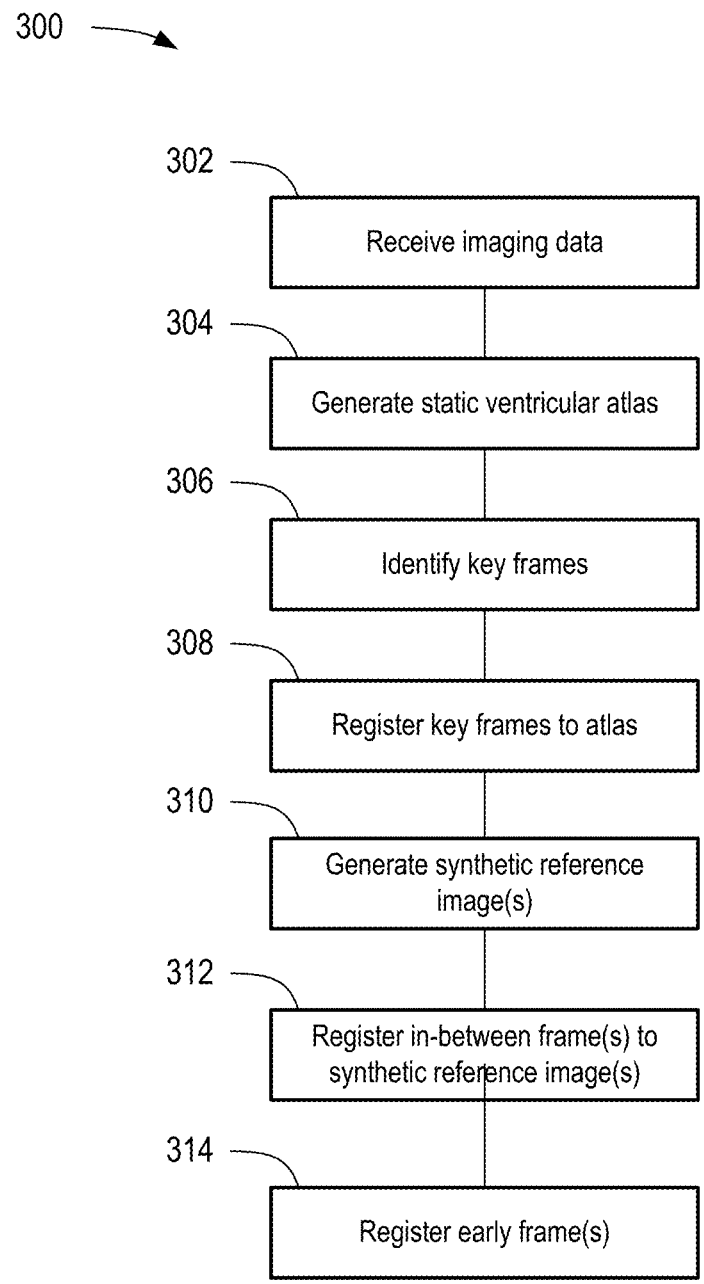
FIG. 3 is a flowchart depicting a process for analyzing imaging data and applying motion correction, according to certain aspects of the present disclosure.

FIG. 3 is a flowchart depicting a process 300 for analyzing imaging data and applying motion correction, according to certain aspects of the present disclosure. Process 300 can be performed using any suitable computing device, such as processing module 106 of FIG. 1. At least a portion of process 300 can occur as part of block 204 of FIG. 2.

At block 302, imaging data can be received. Receiving imaging data at block 302 can be the same as or similar to receiving imaging data at block 202 of FIG. 2.

At block 304, a static ventricular atlas is generated. Generating the ventricular atlas at block 304 can include automatically segmenting LV and/or RV contours using a summed image for a duration of time. In some cases, generating the atlas at block 304 can include generating a summed image of frames over a time period. The time period can be defined in any suitable fashion, such as all time after a threshold time (e.g., all time after two minutes) or a particular duration of time (e.g., the last four minutes of the acquisition). For example, in some cases the duration of time is the last four minutes of the PET MPI acquisition, in which case automatically segmenting LV and RV contours occurs on the summed image from the last four minutes of the imaging data. In some cases, generating the atlas at block 304 can include preprocessing the imaging data, such as by trimming the imaging data in time (e.g., eliminating a final set of frames of the acquisition), area (e.g., eliminating data outside of a region of interest), or volume (e.g., eliminating data outside of a region of interest).

The LV and RV contours can include i) endocardial surfaces of LV, ii) epicardial surfaces of LV, iii) endocardial surfaces of RV, iii) epicardial surfaces of RV, iv) cavities within endocardial surfaces, v) myocardium, or vi) any combination of i-v. These automatically segmented contours from the summed image can then be stored as the ventricular atlas. The ventricular atlas can be a three-dimensional atlas representing the segmented LV and RV contours.

At block 306, a set of key frames are identified. Identifying a key frame can include identifying a particular frame based on the activity-time curves of the LV input region of interest, the RV input region of interest, and the LV myocardium. Identifying a key frame can include determining that the activity-time curves match a key frame definition. The key frame definitions can be established to identify key frames that clearly correspond to regions defined in the ventricular atlas. In some cases, the key frames include a LV blood pool peak frame, which can be defined by tracer activity that fills just the cavity within the LV endocardial surface. In some cases, the key frames include a LV myocardium crossover frame, which can be defined by tracer activity that fills both the LV cavity and the myocardium. In some cases, the key frames include an end of acquisition frame, which can be defined by tracer activity that is mostly within the LV myocardium. In some cases, the in-between frames between a set of key frames can be defined as a phase of the imaging study associated with the set of key frames.

At block 308, each key frame can be registered to the ventricular atlas. Registering a key frame to the ventricular atlas can be based on specific similarity metrics developed for each key frame. In some cases, these similarity metrics can be predetermined, such as via tuning (e.g., tuning as described with reference to blocks 210, 212 of FIG. 2). Similarity metrics can be defined by certain combinations of measures. These measures can include activity counts in various regions defined by the contours (e.g., the LV cavity, the LV myocardium, beyond the LV epicardial surface, and RV), image gradients along epi- or endocardial surfaces, uniformity within the LV myocardium, and mutual information between the dynamic frame and a pseudo image generated by labeling each region with unique pixel values.

At block 310, synthetic reference images can be generated. A synthetic reference image can be generated for each frame between two key frames. The synthetic reference image can be generated by blending the key frames proportionally according to the activity-time curves. For example, for a frame located between the LV blood pool peak frame and the LV myocardium crossover frame, a synthetic reference image can be generated by taking three-dimensional images of the LV blood pool peak frame and the LV myocardium crossover frame and linearly blending them into a synthetic reference image using the ratios of total counts in the LV myocardium to counts in the LV input region of interest as weights.

At block 312, the in-between frames located between two key frames can be registered using the synthetic reference images from block 310. The in-between frame can be registered to is associated synthetic reference image by mutual information. In some cases, registering an in-between frame to its associated synthetic reference image can include using simplex maximization of the mutual information criterion. The simplex maximization can be of a count-based cost-function, which can be customized to that phase of the imaging study.

In some cases, at block 314, early frames (e.g., frames that are prior to the first key frame) can be registered independently with other similarity metrics. For example, frames earlier than the LV blood pool peak frame can be registered using a similarity metric that includes measures involving RV to account for RV blood pool activities in those earlier frames. In some cases, to ensure enough counts exist for a reliable registration, early frames are only registered if they have no less than a threshold (e.g., 20%) value of the peak LV input region of interest activity. In other words, in some cases block 314 includes determining that a frame has less than a threshold value of activity (e.g., a threshold based on the peak LV input region of interest activity) and excluding that frame from automated motion correction.

While described with certain blocks in certain orders, in some case process 300 can occur with additional, fewer, or different blocks in different orders. For example, in some cases, process 300 does not include block 314. In another example, process 300 may include an additional block between block 302 and block 304 to preprocess the imaging data prior to generating the atlas.

While described with reference to cardiac imaging and cardiac structures, in some cases process 300 can be used with other types of imaging data and other structures. For example, imaging of a particular type of tissue can include generating an atlas for that particular type of tissue based on structures that are commonly present in that particular type of tissue.

Figure 4:
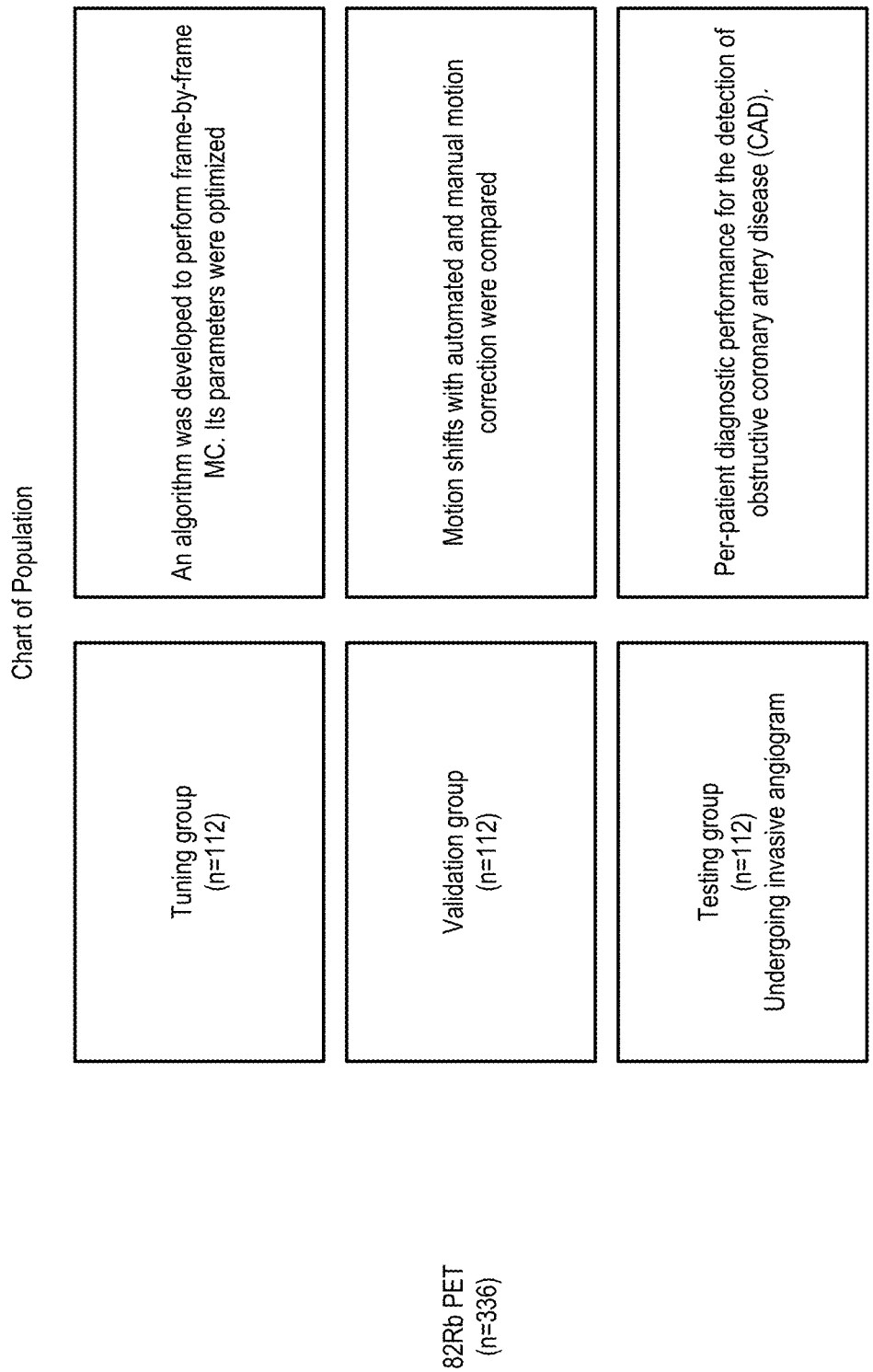
FIG. 4 is a chart depicting a study population as described herein.

FIG. 4 is a chart depicting a study population as described herein. The study population includes a tuning group, a validation group, and a testing group. The tuning group is used to optimize the parameters of the motion correction algorithm. The validation group was used to compare automated motion correction with manual motion correction. The testing group was used to compare the diagnostic performance of automated motion correction for the detection of obstructive CAD.

In the validation group, there were strong correlations and no significant difference between MBF measurements with automated and manual motion correction.

In the testing group, MBF measurements decreased significantly after automated motion correction compared to those before motion correction.

It was determined that minimal vessel stress MBF with automated motion correction showed higher diagnostic performance for predicting significant CAD.

The testing group was also used to compare diagnostic performance for significant CAD between using stress MBF with automated motion correction to a model with ischemic total perfusion deficit (iTPD) and using stress MBF without motion correction. When automated motion correction was used, the addition of stress MBF showed higher diagnostic performance for significant CAD (AUC [95% CI], 0.82 [0.77–0.86] vs. 0.78 [0.74–0.83; p=0.022]), but the addition of stress MBF without motion correction to the model with iTPD did not reach significance (p=0.067).

Figure 5:
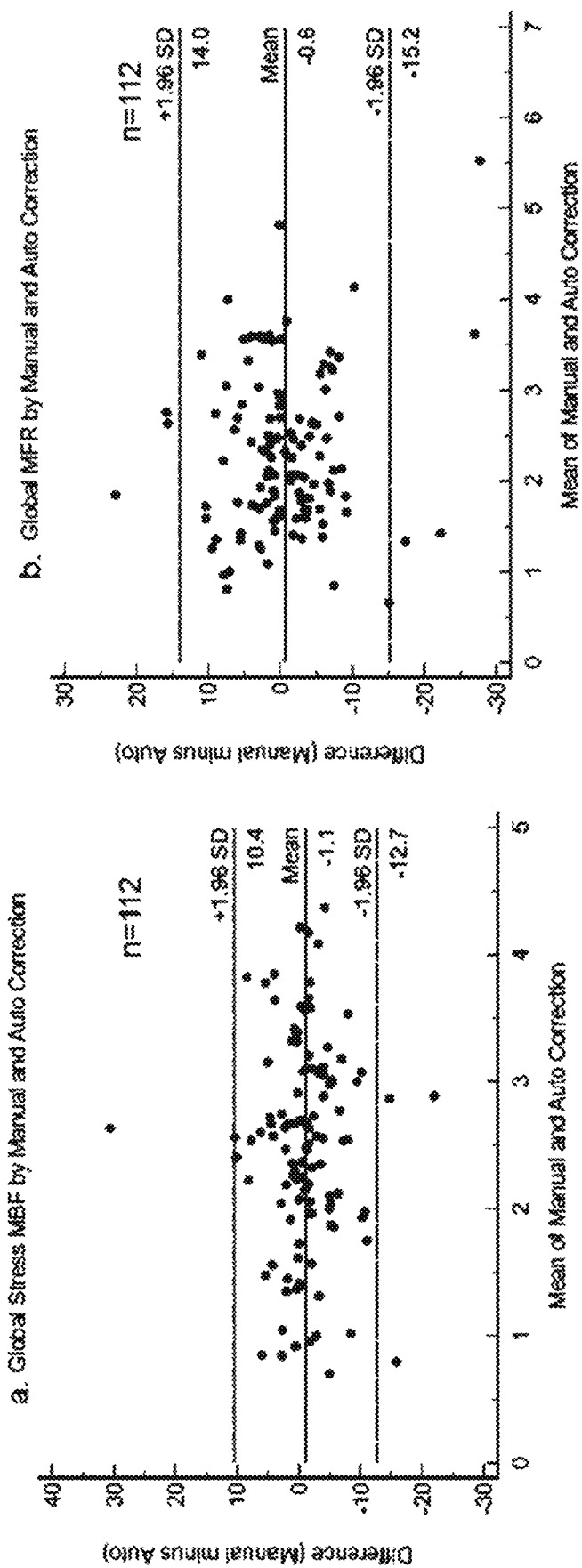
FIG. 5 is a set of charts depicting Bland-Altman plots between manual correction and auto correction according to certain aspects of the present disclosure.

FIG. 5 is a set of Bland-Altman plots of MBF and MFR comparing manual motion correction with automated motion correction, according to certain aspects of the present disclosure. Manual motion correction and automated motion correction show good agreement in both global stress MBF and MFR.

Figure 6:
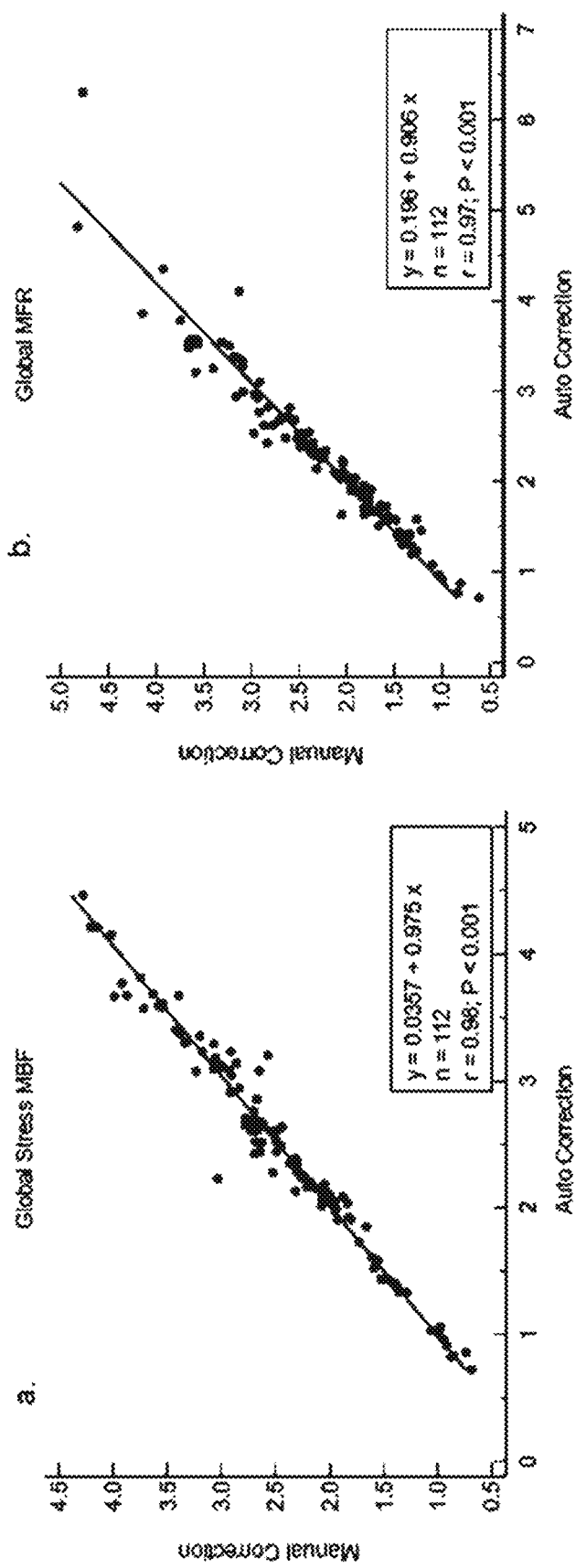
FIG. 6 is a set of charts depicting regression plots comparing manual correction and auto correction according to certain aspects of the present disclosure.

FIG. 6 is a set of regression plots of global stress MBF and global MFR comparing manual correction with automated motion correction, according to certain aspects of the present disclosure. The global MBF (r=0.98, p<0.001) and MFR (r=0.97, p<0.001) values obtained from manual motion correction correlate well with those obtained from automated motion correction.

FIG. 7A is a chart depicting the frequency of manual motion shifts ≥5 mm at stress, as obtained from experienced operators using the validation group of FIG. 4.

FIG. 7B is a chart depicting the frequency of motion shifts difference ≥5 mm between manual and automated correction at stress, according to certain aspects of the present disclosure. At stress, the frequency of motion shifts difference between automated and manual motion correction was less than 5% in septal to lateral and anterior to inferior direction while it was 14% in frame 3 in apex to base direction.

Figure 8A:
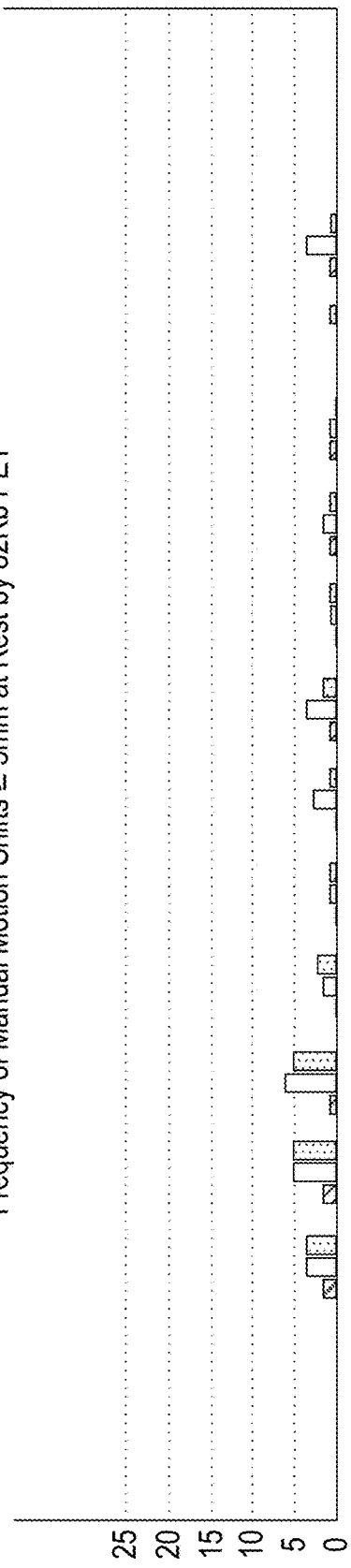
FIG. 8A is a chart depicting the frequency of manual motion shifts ≥5 mm at rest, according to certain aspects of the present disclosure.

FIG. 8A is a chart depicting the frequency of manual motion shifts ≥5 mm at rest, as obtained from experienced operators using the validation group of FIG. 4.

Figure 8B:
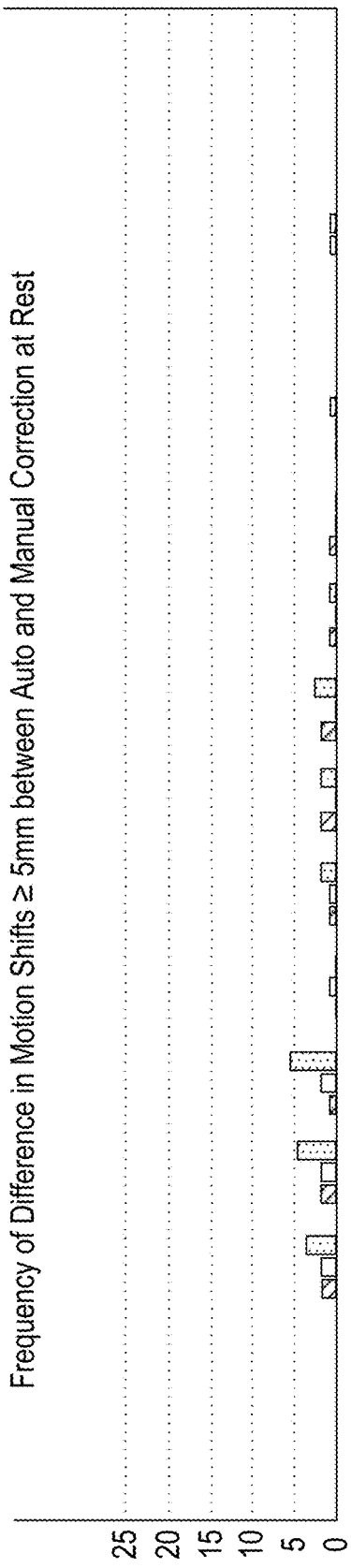
FIG. 8B is a chart depicting the frequency of motion shifts difference ≥5 mm between manual and auto correction at rest, according to certain aspects of the present disclosure.

FIG. 8B is a chart depicting the frequency of motion shifts difference ≥5 mm between manual and automated correction at rest, according to certain aspects of the present disclosure. At rest, the frequency of motion shifts difference between automated and manual motion correction was less than 5% in all three principal directions.

Figure 9:
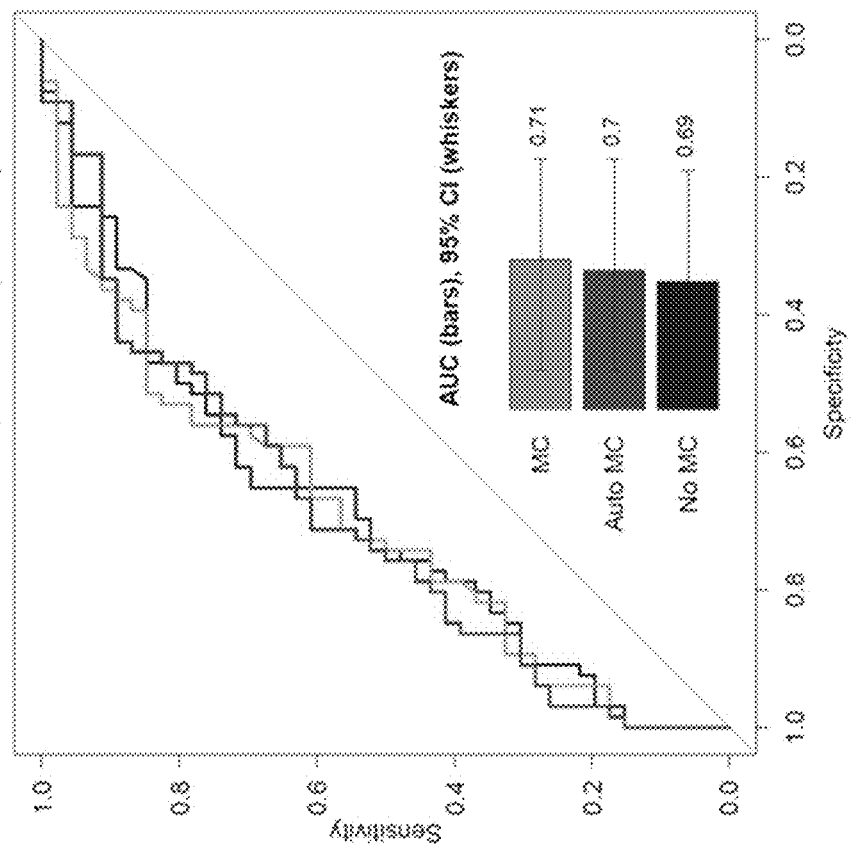
FIG. 9 is a set of charts depicting diagnostic performance of MBF and MFR for detection of obstructive coronary artery disease according to certain aspects of the present disclosure.
Figure 9:
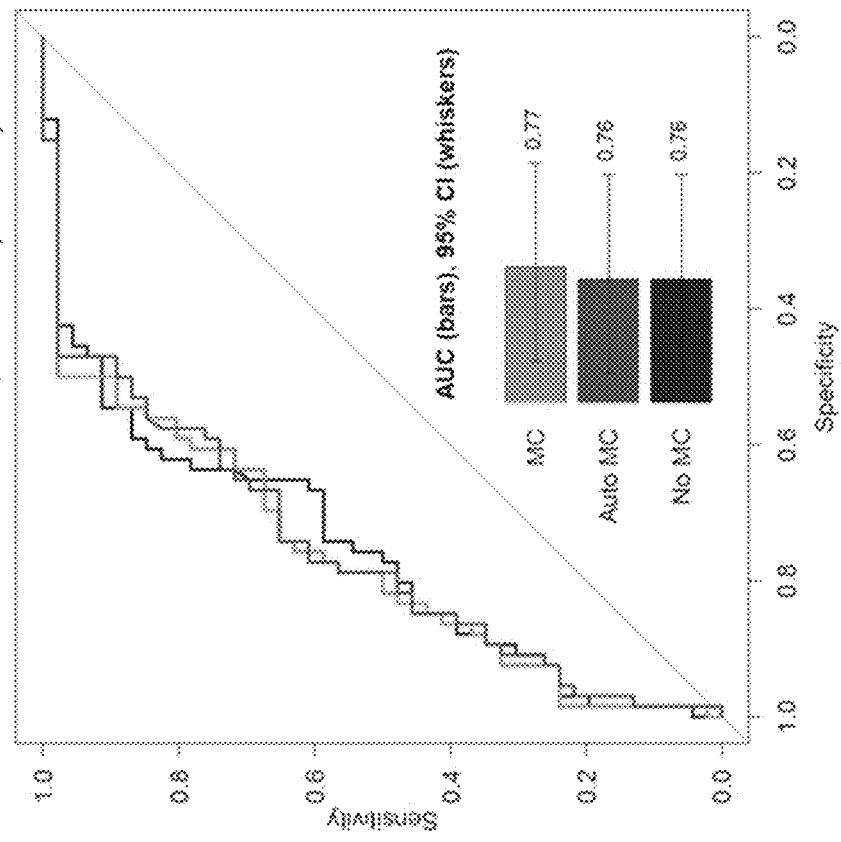

FIG. 9 is a set of charts depicting diagnostic performance of MBF and MFR for detection of obstructive coronary artery disease according to certain aspects of the present disclosure. ROC analysis demonstrated that the AUC of automated motion correction for the detection of CAD was similar to manual motion correction for global estimations.

Figure 10:
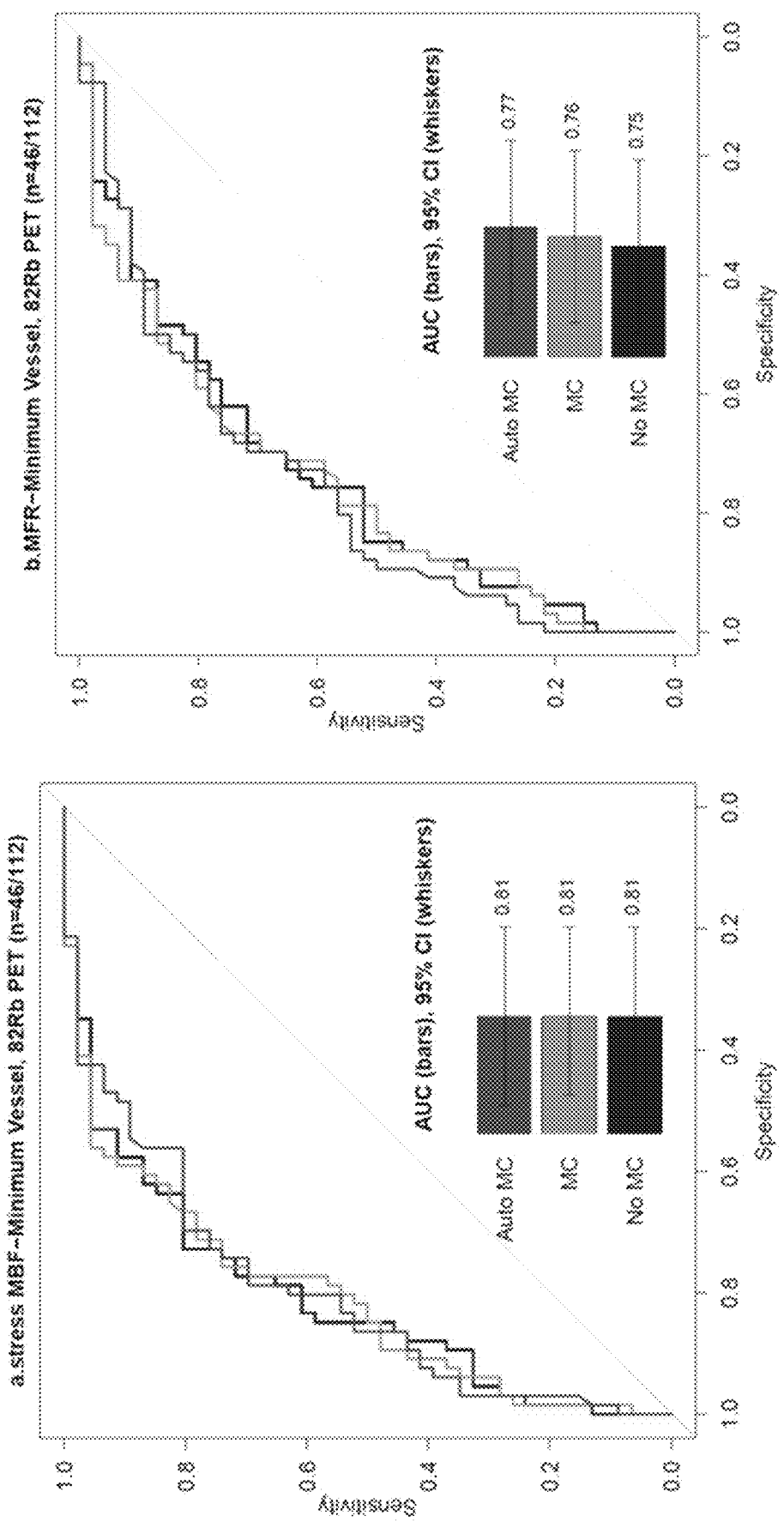
FIG. 10 is a set of charts depicting the diagnostic performance of vessel MBF and MFR for detection of obstructive CAD according to certain aspects of the present disclosure.

FIG. 10 is a set of charts depicting the diagnostic performance of vessel MBF and MFR for detection of obstructive CAD according to certain aspects of the present disclosure. ROC analysis demonstrated that the AUC of automated motion correction for the detection of CAD was similar to manual motion correction for minimal vessel estimations.

Figure 11:
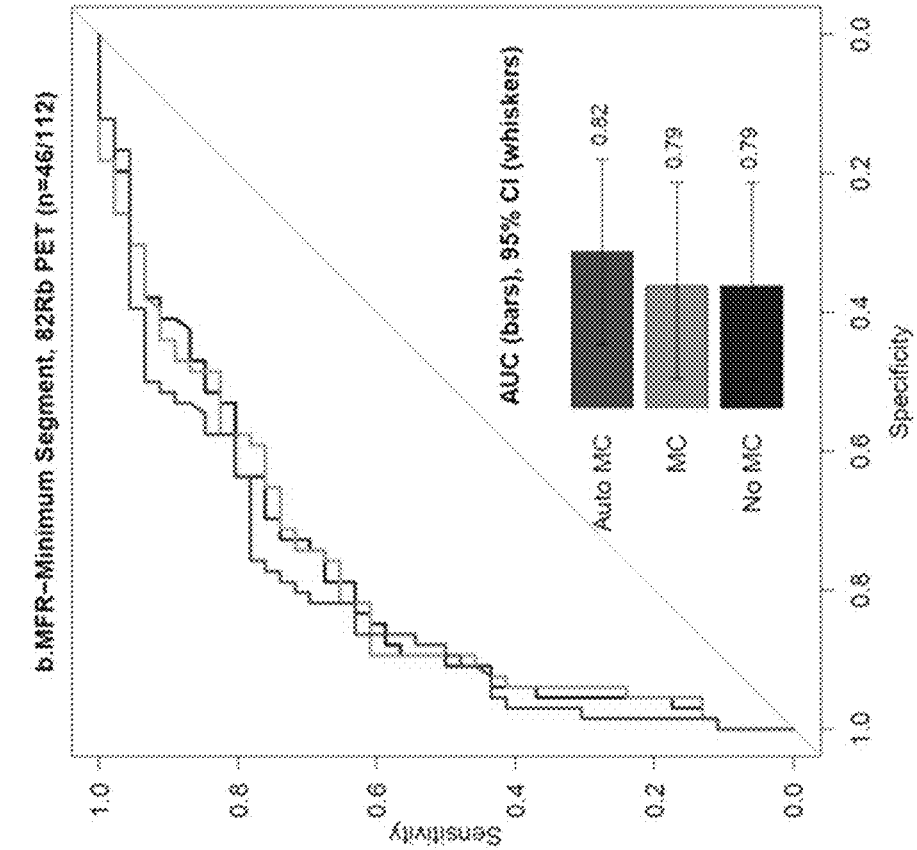
FIG. 11 is a set of charts depicting the diagnostic performance of minimal segmental MBF and MFR for detection of obstructive CAD according to certain aspects of the present disclosure.
Figure 11:
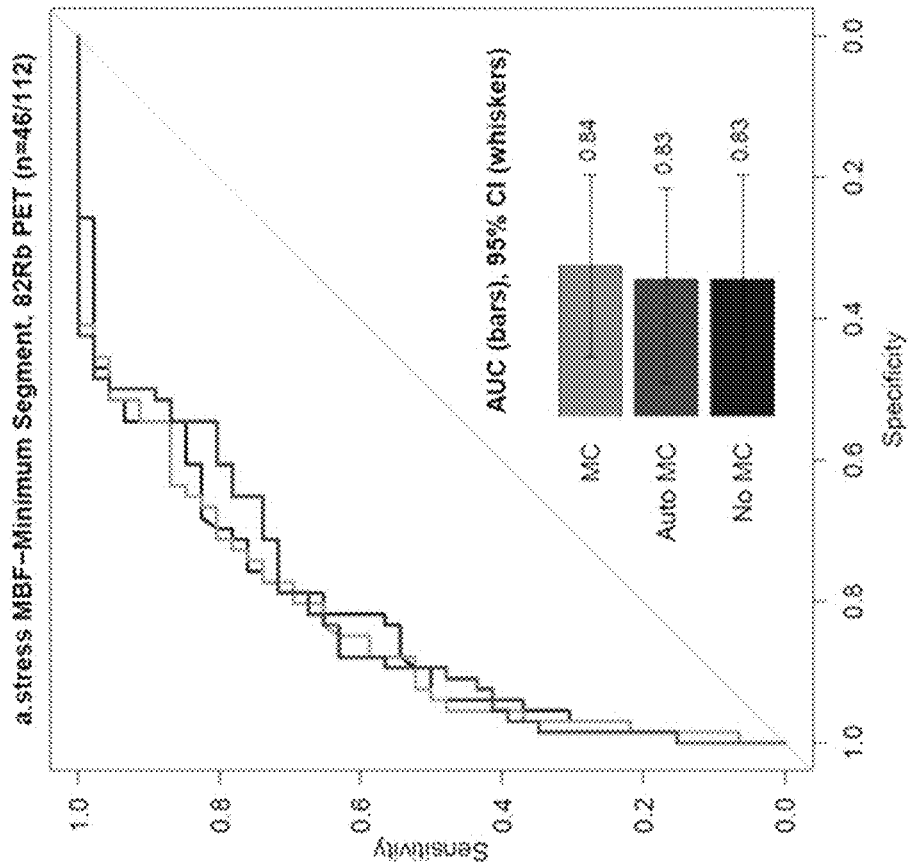

FIG. 11 is a set of charts depicting the diagnostic performance of minimal segmental MBF and MFR for detection of obstructive CAD according to certain aspects of the present disclosure. ROC analysis demonstrated that the AUC of automated motion correction for the detection of CAD was similar to manual motion correction for minimal segment estimations.

Figure 12:
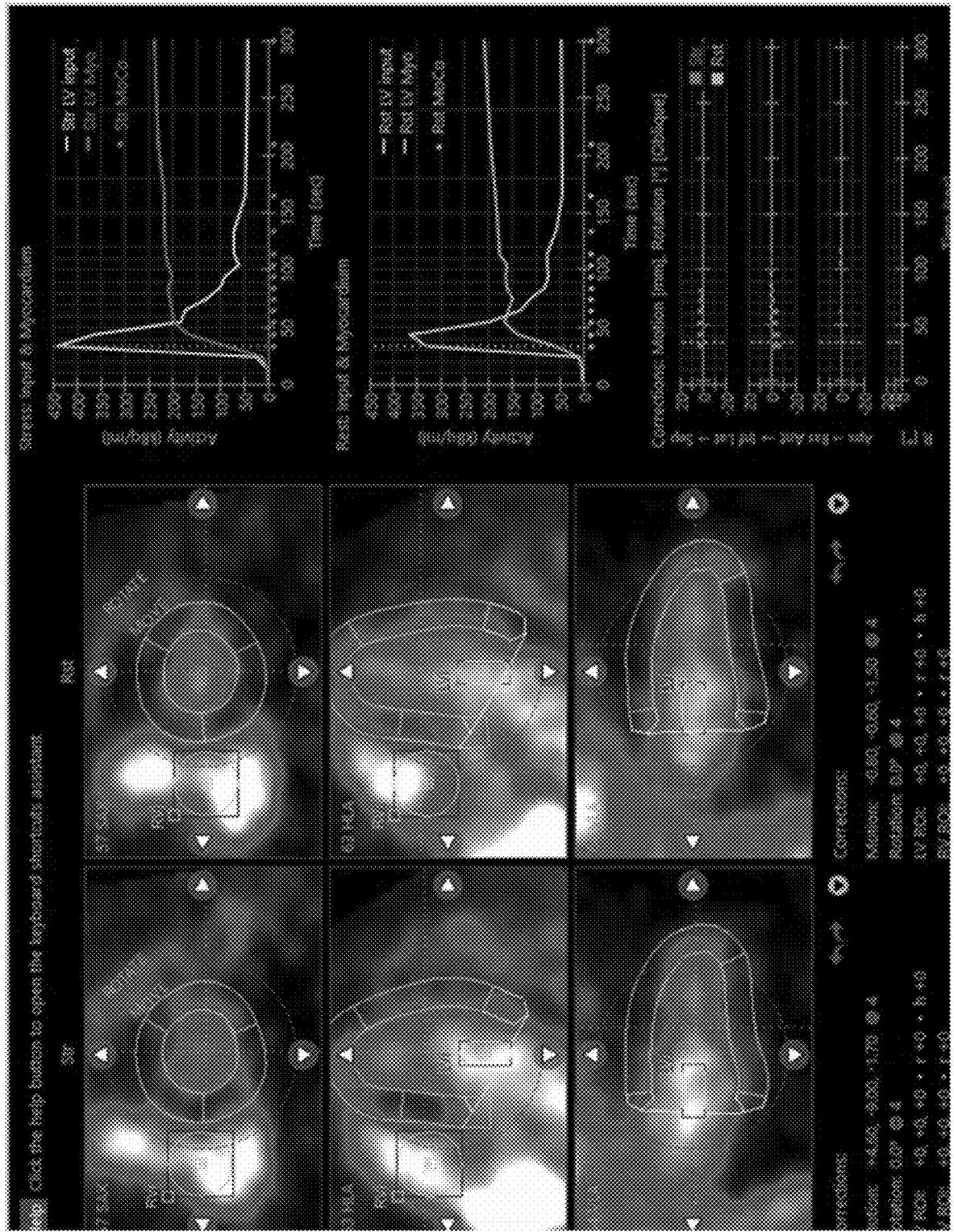
FIG. 12 depicts an interface for automated motion correction according to certain aspects of the present disclosure.

FIG. 12 depicts an interface for automated motion correction according to certain aspects of the present disclosure. The automated algorithm can generate corrections in less than 12 seconds per case for both stress and rest.

Figure 13:
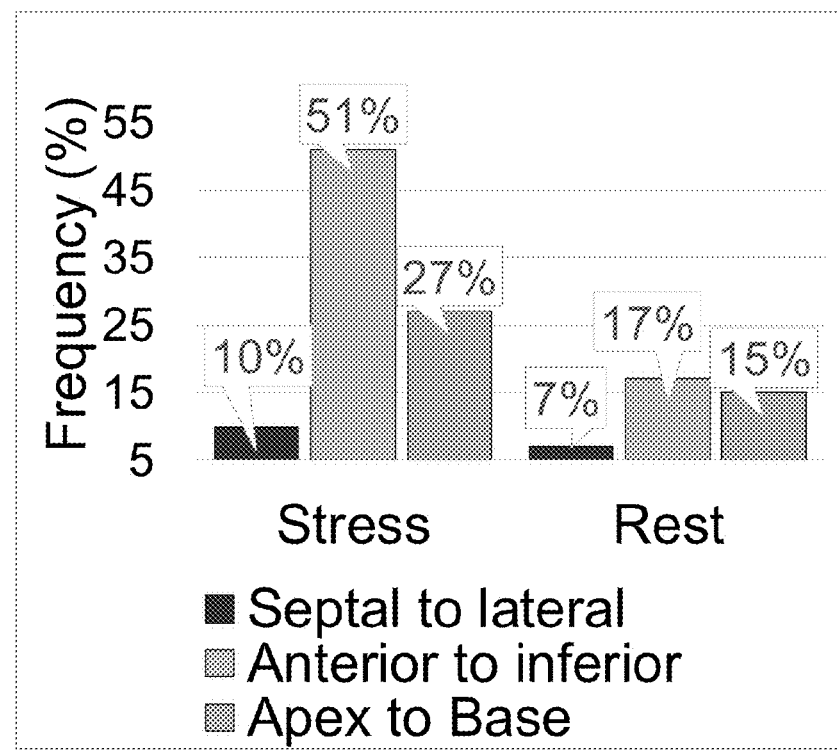
FIG. 13 is a chart depicting frequency of manual motion shifts greater than or equal to 5 mm according to certain aspects of the present disclosure.

FIG. 13 is a chart depicting frequency of manual motion shifts greater than or equal to 5 mm using automated motion correction, according to certain aspects of the present disclosure.

Figure 14:
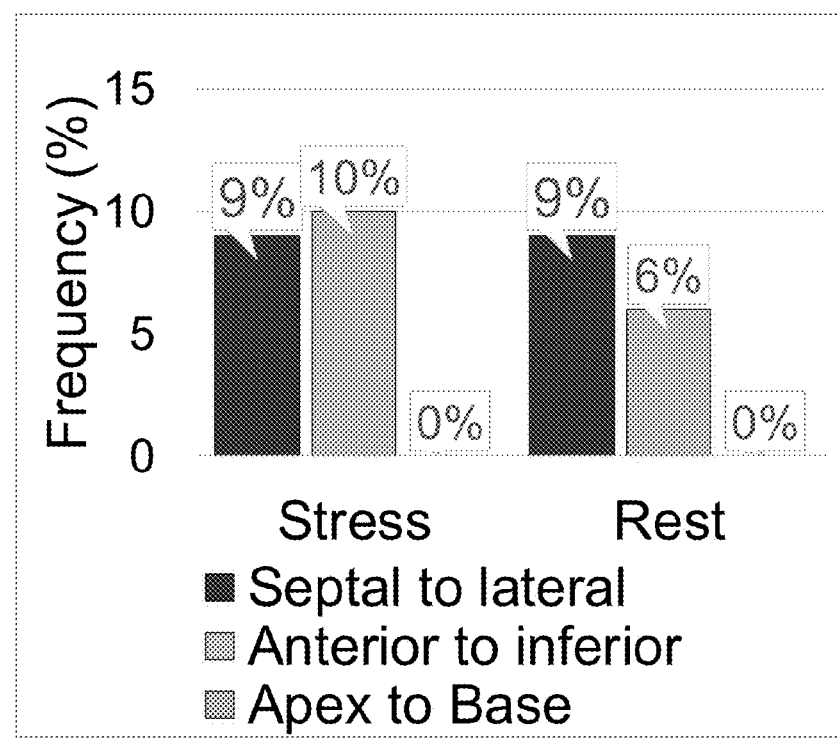
FIG. 14 is a chart depicting frequency of absolute difference between auto and manual MC greater than or equal to 5 mm according to certain aspects of the present disclosure.

FIG. 14 is a chart depicting frequency of absolute difference between automated and manual MC greater than or equal to 5 mm, according to certain aspects of the present disclosure. It is shown that patient MC on dynamic rest/stress 82 Rb PET MPI can be performed automatically and rapidly with good agreement with experienced operators.

Figure 15:
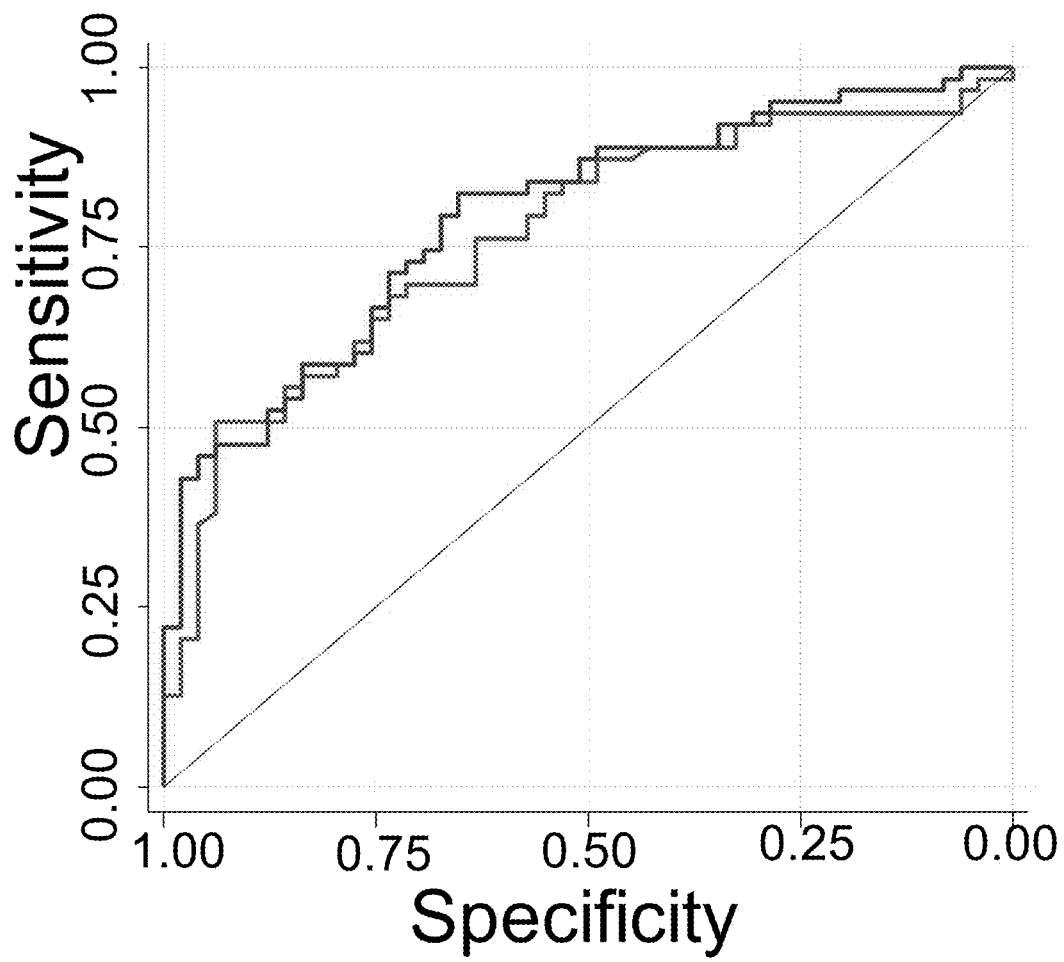
FIG. 15 is a chart depicting diagnostic performance for obstructive CAD by MFR according to certain aspects of the present disclosure.

FIG. 15 is a chart depicting diagnostic performance for obstructive CAD by MFR according to certain aspects of the present disclosure. It can be seen that the AUC for automated MC is greater than that for manual MC. Overall, automated and manual MC demonstrate similar diagnostic performance for the detection of CAD.

Figure 16:
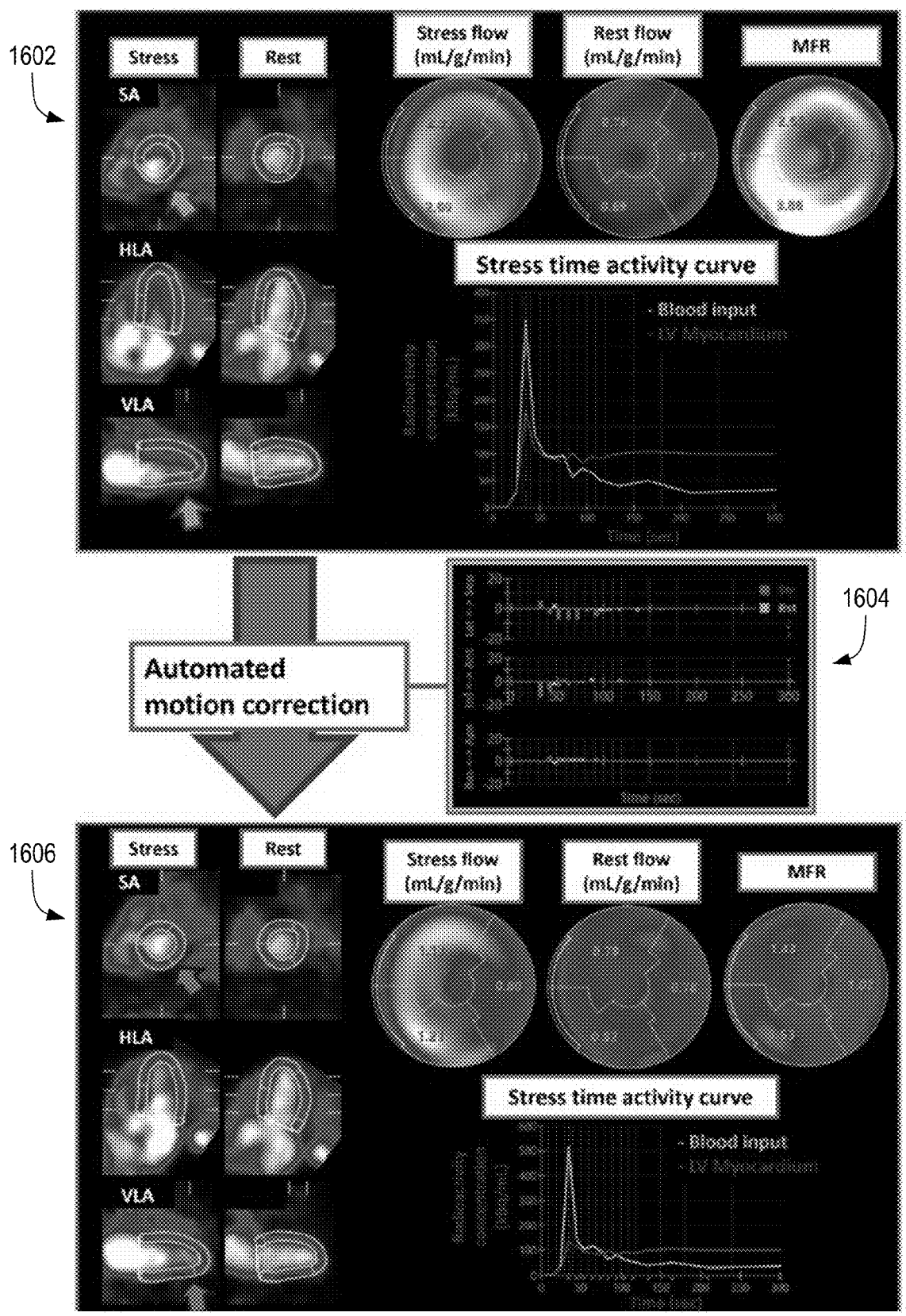
FIG. 16 is a set of user interfaces displays depicting initial imaging data and motion-corrected imaging data, according to certain aspects of the present disclosure.

FIG. 16 is a set of user interfaces displays depicting initial imaging data and motion-corrected imaging data, according to certain aspects of the present disclosure. The top of FIG. 16 includes a display 1602 showing the initial imaging data prior to motion correction. Display 1602 depicts different views of the subject (e.g., cardiac tissue) both at rest and at stress, as well as stress-time activity curves for blood input and LV myocardium.

This initial imaging data can be processed (e.g., according to process 300 of FIG. 3) to determine how far individual frames of the imaging data should be adjusted (e.g., how frames should be moved to become registered to the atlas or synthetic reference) to apply motion correction. Display 1604 depicts motion correction adjustments in three axes (inferior-superior, septal-lateral, and apex-base) over time (e.g., over multiple frames).

The result of the processing can be motion-corrected imaging data, which can be shown in display 1606. Display 1606 can be the same or similar to display 1602, except for the use of motion-corrected imaging data instead of initial imaging data.

It can be seen in FIG. 16 that proper motion correction can be important to achieve accurate results. For example, the polar graph depicting MFR is significantly different in the non-corrected, initial imaging data seen in display 1602 than it is in the motion-corrected imaging data seen in display 1606.

In the example imaging study shown in FIG. 16, the subject had significant myocardial motion. The LV contours before motion correction were automatically computed from summed frames after 2 minutes. Before the correction, the inferior LV contour overlapped substantially with the activity of the blood pool, and the anterior LV contour was far from the actual LV myocardium (orange arrows). The time activity curve shows that LV myocardial activities are overestimated before motion correction (red curve). Those activities were corrected after automated motion correction (blue arrows). The middle display 1604 shows motion correction results for each direction and each frame (maximum magnitude of motion correction was 19.9 mm at stress and 6.3 mm at rest). Global MFR decreased from 2.90 to 1.33 after motion correction. Although this subject showed normal perfusion, coronary angiography showed significant stenosis in the proximal LAD and RCA (right dominant system). As used in FIG. 16, HLA refers to horizontal long axis; LAD refers to left anterior descending artery; LV refers to left ventricle; MC refers to motion correction; RCA refers to right coronary artery; SAX refers to short axis; and VLA refers to vertical long axis.

Figure 17:
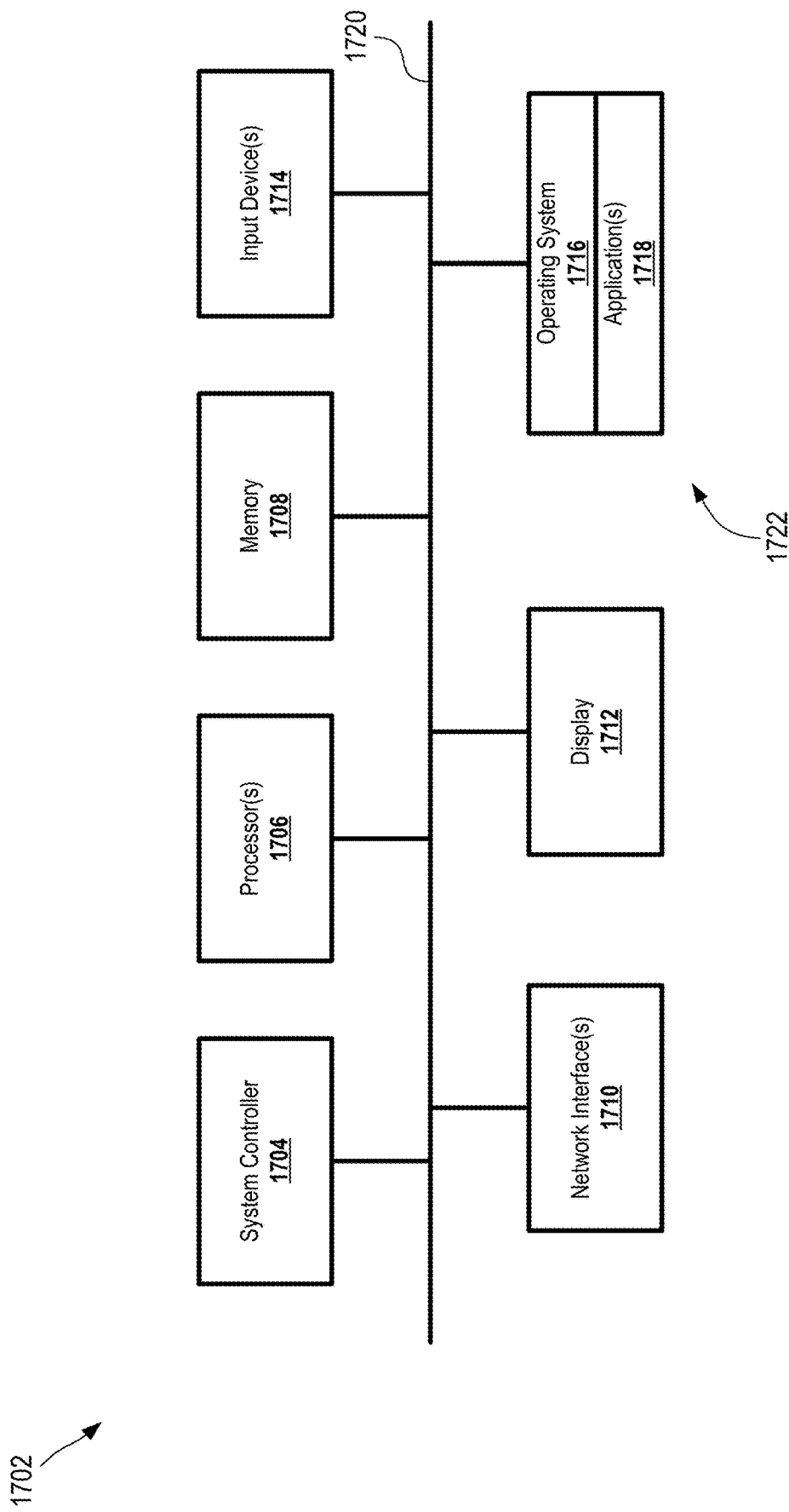
FIG. 17 is a block diagram of an example system architecture for implementing features and processes of the present disclosure.

FIG. 17 is a block diagram of an example system architecture 1702 for implementing features and processes of the present disclosure, such as those presented with reference to processes 200 and 300 of FIGS. 2 and 3, respectively. The features and processes disclosed herein can be implemented using one or multiple instances of 1702. The system architecture 1702 can be used to implement a server (e.g., a cloud-accessible server), a user device (e.g., a smartphone or personal computer), or any other suitable device for performing some or all of the aspects of the present disclosure. The system architecture 1702 can be implemented on any electronic device that runs software applications derived from compiled instructions, including without limitation personal computers, servers, smart phones, electronic tablets, game consoles, email devices, and the like. In some implementations, the system architecture 1702 can include one or more processors 1706, one or more input devices 1714, one or more display devices 1712, one or more network interfaces 1710, and one or more computer-readable media 1722. Each of these components can be coupled by bus 1720.

Display device 1712 can be any known display technology, including but not limited to display devices using Liquid Crystal Display (LCD) or Light Emitting Diode (LED) technology. Processor(s) 802 can use any known processor technology, including but not limited to graphics processors and multi-core processors. Input device 1714 can be any known input device technology, including but not limited to a keyboard (including a virtual keyboard), mouse, track ball, and touch-sensitive pad or display. In some cases, audio inputs can be used to provide audio signals, such as audio signals of an individual speaking. Bus 1720 can be any known internal or external bus technology, including but not limited to ISA, EISA, PCI, PCI Express, NuBus, USB, Serial ATA or FireWire.

Computer-readable medium 1722 can be any medium that participates in providing instructions to processor 1706 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 1722 can include various instructions for implementing operating system 1716 and applications 1718 such as computer programs. The operating system 1716 can be multi-user, multiprocessing, multi-tasking, multithreading, real-time and the like. The operating system 1716 performs basic tasks, including but not limited to: recognizing input from input device 1714; sending output to display device 1712; keeping track of files and directories on computer-readable medium 1722; controlling peripheral devices (e.g., storage drives, interface devices, etc.) which can be controlled directly or through an I/O controller; and managing traffic on bus 1720. Computer-readable medium 1722 can include various instructions for implementing firmware processes, such as a BIOS. Computer-readable medium 1722 can include various instructions for implementing any of the processes described herein, including at least processes 200 and 300 of FIGS. 2 and 3, respectively.

Memory 1708 can include high-speed random access memory and/or non-volatile memory, such as one or more magnetic disk storage devices, one or more optical storage devices, and/or flash memory (e.g., NAND, NOR). The memory 1708 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 1708 can store an operating system, such as Darwin, RTXC, LINUX, UNIX, OS X, WINDOWS, or an embedded operating system such as VxWorks.

System controller 1704 can be a service processor that operates independently of processor 1706. In some implementations, system controller 1704 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

One or more elements or aspects or steps, or any portion(s) thereof, from one or more of any of claims 1 to 16 below can be combined with one or more elements or aspects or steps, or any portion(s) thereof, from one or more of any of the other claims 1 to 16 or combinations thereof, to form one or more additional implementations and/or claims of the present disclosure.

What is claimed is:

1. A method, comprising:
receiving imaging data associated with a dynamic positron emission tomography (PET) myocardial perfusion imaging (MPI) study;
generating a static ventricular atlas based on the imaging data;
automatically applying motion correction to the imaging data based at least in part on the static ventricular atlas to generate motion-corrected imaging data; and analyzing the motion-corrected imaging data to obtain at least one quantitative value associated with the myocardial perfusion imaging study.

2. The method of claim 1, wherein generating the static ventricular atlas includes:
generating a static summed image using the received imaging data; and
segmenting left ventricular (LV) and right ventricular (RV) contours based on the static summed image.

3. The method of claim 2, wherein generating the static summed image includes generating the static summed image using frames between a start frame and an end frame, the start frame occurring after a threshold period of time following the start of the PET MPI study.

4. The method of claim 1, wherein automatically applying motion correction includes:
identifying a set of key frames from the imaging data; and
registering each of the set of key frames with the static ventricular atlas.

5. The method of claim 4, wherein automatically applying motion correction further includes:
generating one or more synthetic reference images based at least in part on two or more of the key frames; and
registering one or more frames of the imaging data between the two or more of the key frames using the one or more synthetic reference images.

6. The method of claim 4, wherein the set of key frames includes at least a first key frame and a second key frame, wherein automatically applying motion correction further includes, for each frame between the first key frame and the second key frame:
generating a synthetic reference image by blending the first key frame and the second key frame; and
registering the given frame to the respective synthetic reference image.

7. The method of claim 6, wherein generating the synthetic reference image includes blending the first key frame and the second key frame proportionally according to the activity-time curves.

8. The method of claim 6, wherein the set of key frames includes at least a third key frame, wherein automatically applying motion correction further includes, for each frame between the second key frame and the third key frame:
generating a synthetic reference image by blending the second key frame and the third key frame; and
registering the given frame to the respective synthetic reference image.

9. The method of claim 6, wherein registering the given frame to the respective synthetic reference image includes using simplex maximization of mutual information criterion.

10. The method of claim 4, wherein the set of key frames includes i) a left ventricle blood pool peak frame, ii) a left ventricle blood pool and myocardium crossover frame; iii) an end-of-acquisition frame; or iv) any combination of i-iii.

11. The method of claim 4, wherein, for each of the set of key frames, registering the given key frame with the static ventricular atlas is based at least in part on a specific similarity metric associated with the given key frame.

12. The method of claim 11, wherein each of the specific similarity metrics is based at least in part on i) counts within regions defined by the contours; ii) image gradients along epi- or endocardial surfaces; iii) uniformity within the left ventricle myocardium; iv) mutual information between the dynamic frame and a pseudo image generated by labeling each region with unique pixel values; or v) any combination of i-iv.

13. The method of claim 4, wherein automatically applying motion correction further includes, for each frame prior to the first key frame:
determining that the given frame has an activity value no less than a threshold value, the threshold value being based on a peak left ventricular (LV) input region of interest activity;
registering the given frame using a similarity metric that includes a measurement of right ventricular (RV) activity.

14. The method of claim 1, wherein the imaging data includes first imaging data acquired of a patient while the patient was under stress, and second imaging data acquired of a patient while the patient was at rest.

15. The method of claim 1, wherein the at least one quantitative value includes i) myocardial blood flow; ii) flow reserve; or iii) both i and ii.

16. The method of claim 1, wherein the motion correction algorithm is customized to different dynamic phases of the dynamic PET MPI study.

17. The method of claim 1, wherein one or more parameters of the motion correction algorithm are tuned using tuning data, the tuning data including historical dynamic PET MPI imaging data from a plurality of patients.

18. The method of claim 1, further comprising generating a coronary artery disease inference based at least in part on the at least one quantitative value, wherein the coronary artery disease inference is indicative of whether or not a subject of the PET MPI study is likely to have coronary artery disease.

19. A system comprising:
a control system including one or more processors; and
a memory having stored thereon machine readable instructions;
wherein the control system is coupled to the memory, and the method of claim 1 is implemented when the machine executable instructions in the memory are executed by at least one of the one or more processors of the control system.

20. A computer program product, embodied in a non-transitory computer readable medium, comprising instructions which, when executed by a computer, cause the computer to carry out the method of claim 1.

* * * * *